US008944665B2

(12) United States Patent
Huang et al.

(10) Patent No.: US 8,944,665 B2
(45) Date of Patent: Feb. 3, 2015

(54) BACK FRAME, METHOD FOR MANUFACTURING BACK FRAME, AND BACKLIGHT SYSTEM

(75) Inventors: Chong Huang, Shenzhen (CN); Yu-Chun Hsiao, Shenzhen (CN); Yi-Cheng Kuo, Shenzhen (CN); Quan Li, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 463 days.

(21) Appl. No.: 13/380,825

(22) PCT Filed: Nov. 24, 2011

(86) PCT No.: PCT/CN2011/082805
§ 371 (c)(1),
(2), (4) Date: Dec. 24, 2011

(87) PCT Pub. No.: WO2013/071620
PCT Pub. Date: May 23, 2013

(65) Prior Publication Data
US 2013/0128506 A1    May 23, 2013

(30) Foreign Application Priority Data

Nov. 18, 2011   (CN) .......................... 2011 1 03665130

(51) Int. Cl.
*F21V 7/04*       (2006.01)
*F21V 8/00*       (2006.01)
*G02F 1/1333*     (2006.01)

(52) U.S. Cl.
CPC ........ *G02B 6/0086* (2013.01); *G02F 1/133308* (2013.01); *G02F 2001/133314* (2013.01); *G02F 2001/133328* (2013.01); *G02F 2201/46* (2013.01)

USPC ........................... 362/632; 362/633; 362/634

(58) Field of Classification Search
CPC ............ G02B 6/0086; G02F 1/133608; G02F 2001/133317; G02F 2001/133314; G02F 2201/46; G02F 2001/133328
USPC ................................................. 362/632–634
See application file for complete search history.

(56) References Cited

U.S. PATENT DOCUMENTS 7,134,780 B2 *  11/2006   Tsai .............................. 362/633
7,515,221 B2 *   4/2009   Jeon ............................. 362/633

FOREIGN PATENT DOCUMENTS

CN    1662124 A    8/2005
CN    2737123 Y    10/2005
(Continued)

*Primary Examiner* — William Carter
(74) *Attorney, Agent, or Firm* — Cheng-Ju Chiang

(57) ABSTRACT

The present invention provides a back frame of flat panel display device. The back frame includes at least two primary assembling pieces and the at least two primary assembling pieces are connected through joining; the at least two primary assembling pieces having lengths that are adjustable in order to form a main frame structures of the back frame that is of various sizes, in which lengths of two parallel sides of the main frame structure are both subjected to adjustment. The present invention also provides a method for manufacturing a back frame of flat panel display device and a backlight system. Through above arrangement, the back frame mold is made simple in structure and the expenditure of the back frame mold is reduced, and the material used for back frame is saved so as to lower down the manufacturing cost of flat panel display device.

16 Claims, 15 Drawing Sheets

(56) References Cited

FOREIGN PATENT DOCUMENTS

| | | |
|---|---|---|
| CN | 200997031 Y | 12/2007 |
| CN | 101150942 A | 3/2008 |
| CN | 101241268 A | 8/2008 |
| CN | 201177980 Y | 1/2009 |
| CN | 201672468 U | 12/2010 |
| CN | 201757332 U | 3/2011 |
| CN | 102109706 A | 6/2011 |
| CN | 102385820 A | 3/2012 |

* cited by examiner

BACK FRAME, METHOD FOR MANUFACTURING BACK FRAME, AND BACKLIGHT SYSTEM

BACKGROUND OF THE INVENTION

1. Field of the Invention

The present invention relates to the field of displaying techniques, and in particular to a back frame, a method for manufacturing back frame, and a backlight system.

2. The Related Arts

The state-of-the-art liquid crystal display device comprises a front bezel, a panel, and a backlight module, of which the backlight module comprises a back frame, a reflector plate, a light guide, and a lighting assembly.

Currently, a variety of display panels of different sizes are available in the market to meet different needs of general consumers. For example, in the field of television set, the sizes of liquid crystal panels include 31.5, 42, 46, 48, and 55 inches. Different back frame molds are provided for liquid crystal planes of different sizes.

Referring to FIG. 1, FIG. 1 is a schematic view showing a conventional back frame of liquid crystal display device. As shown in FIG. 1, the conventional back frame 10 is a unitary back frame, and it is often that a unitary back frame 10 is made with metal stamping or plastic injection molding. The unitary back frame 10 consumes much material and has a high material cost. Further, a large-sized back frame 10 requires large-sized stamping equipment, and the size of mold corresponding to such a back frame 10 is large and the structure complicated, making the expenditure of the back frame mold high. As a consequence, the conventional back frame is of a high cost.

SUMMARY OF THE INVENTION

The technical issue to be addressed by the present invention is to provide a back frame, a method for manufacturing back frame, and a backlight system, which help lowering the material cost and mold cost.

To address the above technical issue, the present invention adopts a technical solution that provides a back frame of flat panel display device, the back frame comprising at least two primary assembling pieces, the at least two primary assembling pieces being connected through joining; the at least two primary assembling pieces have lengths that are adjustable in order to form a main frame structure of the back frame that is of various sizes, in which lengths of two parallel sides of the main frame structure are both subjected to adjustment.

Wherein, the length-adjustable primary assembling pieces comprises a first sub-assembling piece and a second sub-assembling piece that are joined at ends.

Wherein, the back frame comprises a first fastener and a second fastener, the first fastener and the second fastener being set at different locations to join the first sub-assembling piece and the second sub-assembling piece.

Wherein, the first sub-assembling piece has an end forming a first slit extending in a lengthwise direction of the first sub-assembling piece and the second sub-assembling piece has an end forming a second slit extending in a lengthwise direction of the second sub-assembling piece; the first fastener extends through the first slit and the second slit to join the first sub-assembling piece and the second sub-assembling piece and the second fastener extends through the first slit and the second slit to join the first sub-assembling piece and the second sub-assembling piece.

Wherein, the first slit has two side walls between which a distance is periodically variable in the direction of the first slit to form a plurality of alternating wide spaces and narrow spaces, the wide spaces mating size of the first fastener and the fastener, the narrow spaces being smaller than the size of the first fastener and the fastener; the second slit has two side walls between which a distance is periodically variable in the direction of the second slit to form a plurality of alternating wide spaces and narrow spaces, the wide spaces mating the size of the first fastener and fastener, the narrow spaces being smaller than the size of the first fastener and the fastener.

Wherein, the first sub-assembling piece has an end forming a first through hole and a second through hole spaced in a lengthwise direction of the first sub-assembling piece and the second sub-assembling piece has an end forming a slit extending in a lengthwise direction of the second sub-assembling piece, the slit having a length greater than a spacing distance between the first through hole and the second through hole; the first fastener extends through the first through hole and the slit to join the first sub-assembling piece and the second sub-assembling piece and the second fastener extends through the second through hole and the slit to join the first sub-assembling piece and the second sub-assembling piece.

Wherein, the first sub-assembling piece has an end forming a through hole and a first slit spaced in a lengthwise direction of the first sub-assembling piece, the first slit extending in the lengthwise direction of the first sub-assembling piece, and the second sub-assembling piece has an end forming a second slit extending in a lengthwise direction of the second sub-assembling piece, the second slit having a length greater than a spacing distance between the through hole and the first slit; the first fastener extends through the through hole and the second slit to join the first sub-assembling piece and the second sub-assembling piece and the second fastener extends through the first slit and the second slit to join the first sub-assembling piece and the second sub-assembling piece.

Wherein, the first sub-assembling piece has an end forming a slide slot extending in a lengthwise direction of the first sub-assembling piece, the first slit extending in the lengthwise direction of the first sub-assembling piece, and the second sub-assembling piece has an end forming a slide track extending in a lengthwise direction of the second sub-assembling piece; the slide slot mates the slide track.

Wherein, the length-adjustable primary assembling piece comprises a first sub-assembling piece, a second sub-assembling piece, and an intermediate assembling piece, the first sub-assembling piece being joined to an end of the intermediate assembling piece, the second sub-assembling piece being joined to another end of the intermediate assembling piece.

Wherein, the at least two primary assembling pieces comprise first and second primary assembling pieces that are joined to each other, in which the first primary assembling piece has an end having a surface forming at least two joint sections that are arranged to space from each other in a lengthwise direction of the first primary assembling piece, the first primary assembling piece using one of the joint sections to join a corresponding end of the second primary assembling piece in order to form a main frame structure of different size for the back frame.

Wherein, the joint sections comprise recesses formed in a surface of the first primary assembling piece and having a shape corresponding to the end of the second primary assembling piece for receiving the end of the second primary assembling piece.

Wherein, the recess of the first primary assembling piece forms in a bottom thereof a third through hole, the second primary assembling piece forming in a corresponding location a fourth through hole, the back frame comprising a fastener, the fastener extending through the first through hole and the second through hole to join the first primary assembling piece and the second primary assembling piece to each other.

Wherein, the joint sections comprise recesses formed in a surface of the first primary assembling piece, the second primary assembling piece having an end having a surface forming, at corresponding locations, at least two protrusions that are arranged to space from each other in a lengthwise direction of the second primary assembling piece, one of the protrusions being receivable in the recesses to join the first primary assembling piece and the second primary assembling piece to each other.

Wherein, the back frame comprises a third primary assembling piece and a fourth primary assembling piece; and the first primary assembling piece, the second primary assembling piece, the third primary assembling piece, and the fourth primary assembling piece are straight linear and are joined to each other in a leading end-to-tailing end manner to form a rectangular main frame structure enclosing the back frame.

Wherein, the back frame comprises secondary assembling pieces arranged in the main frame structure, the secondary assembling pieces comprise a first secondary assembling piece and a second secondary assembling piece, the first secondary assembling piece having two ends respectively joined to at least two primary assembling pieces of the first primary assembling piece, the second primary assembling piece, the third primary assembling piece, and the fourth primary assembling piece, the second secondary assembling piece having two ends respectively joined to at least two primary assembling pieces of the first primary assembling piece, the second primary assembling piece, the third primary assembling piece, and the fourth primary assembling piece.

Wherein, the two ends of the first secondary assembling piece are respectively joined to the first primary assembling piece and the second primary assembling piece that are adjacent to each other and the two ends of the second secondary assembling piece are respectively joined to the third primary assembling piece and the fourth primary assembling piece that are adjacent to each other; or the two ends of the first secondary assembling piece are respectively joined to the first primary assembling piece and the third primary assembling piece that are opposite to each other and the two ends of the second secondary assembling piece are respectively joined to the first primary assembling piece and the third primary assembling piece that are opposite to each other, and the second primary assembling piece, the fourth primary assembling piece, the first secondary assembling piece, and the second secondary assembling piece are arranged parallel to each other.

Wherein, the back frame comprises at least one bracing piece, which is releasably fixed to one or more of the first primary assembling piece, the second primary assembling piece, the third primary assembling piece, the fourth primary assembling piece, the first secondary assembling piece, and the second secondary assembling piece, the bracing piece forming a bump.

To address the above technical issue, the present invention adopts a technical solution that provides a method for making a back frame of flat panel display device, the method comprising manufacturing at least two primary assembling pieces of back frame; and joining the at least two primary assembling pieces, in which lengths of the at least two primary assembling pieces are adjustable in order to form a main frame structure of the back frame having various sizes, wherein length adjustment is carried out on two parallel sides of the main frame structure.

Wherein, the step of manufacturing at least two primary assembling pieces of back frame comprises: manufacturing at least first and second primary assembling pieces, in which the first primary assembling piece has an end forming at least two joint sections, each of the joint sections having a structure that mates a corresponding end of the second primary assembling piece; and the step of joining the at least two primary assembling pieces comprises: selecting one joint section of the at least two joint sections according to a size of the back frame to join the corresponding end of the second primary assembling piece.

Wherein, when an additional joint section is present between joining location of the second primary assembling piece and the end of the first primary assembling piece, before or after the step of selecting one joint section of the at least two joint sections according to a size of the back frame to join the corresponding end of the second primary assembling piece, the additional joint section of the first primary assembling piece that is located outward of the joining position of the second primary assembling piece is trimmed off.

To address the above technical issue, the present invention adopts a technical solution that provides a backlight system, which comprises a light source, a light homogenization mechanism, and a back frame; and the back frame carries the light source and the light homogenization mechanism, the back frame being the back frame described above.

The efficacy of the present invention is that to be distinguished from the state of the art, the present invention provides a back frame, a method for manufacturing back frame, and a backlight system comprising at least two primary assembling pieces, in which at least one primary assembling piece has a length that is adjustable in order to form a main frame structure of the back frame that of various sizes. Through this arrangement, the back frame mold is made simple in structure and the expenditure of the back frame mold is reduced, and the material used for back frame is saved so as to lower down the manufacturing cost of flat panel display device.

DETAILED DESCRIPTION OF THE PREFERRED EMBODIMENTS

Figure 1:
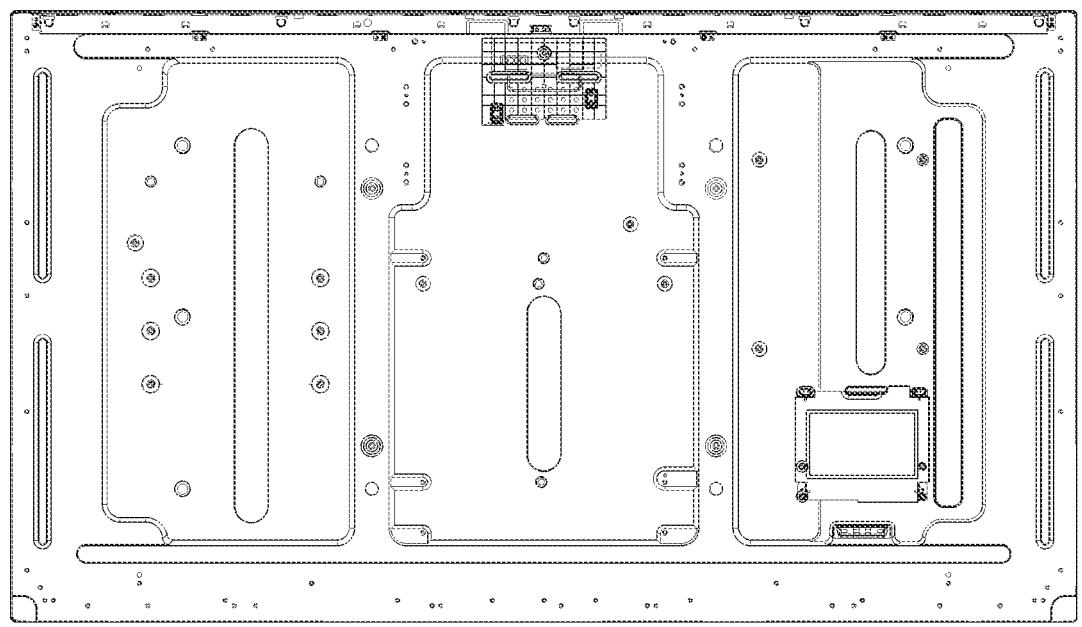
FIG. 1 is a schematic view showing a conventional back frame of liquid crystal display device.
Figure 2:
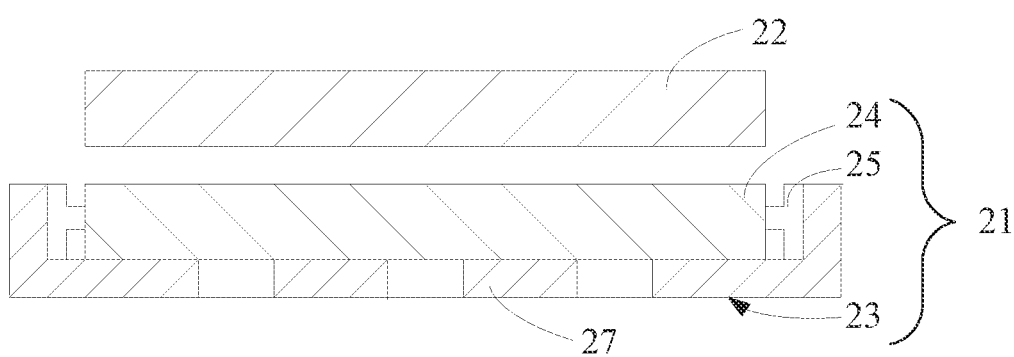
FIG. 2 is a schematic view showing a flat panel display device according to a first embodiment of the present invention.
Figure 3:
FIG. 3 is a schematic view showing a back frame of a flat panel display device according to a second embodiment of the present invention.

Referring to FIGS. 2-3, FIG. 2 is a schematic view showing a flat panel display device according to a first embodiment of the present invention and FIG. 3 is a schematic view showing a back frame of a flat panel display device according to a second embodiment of the present invention. As shown in FIG. 2, the flat panel display device 20 according to the instant embodiment comprises: a backlight system 21 and a display panel 22. The backlight system 21 is arranged on a back side of the display panel 22 and supplies light to the display panel 22.

In the instant embodiment, the backlight system 21 comprises a light source 25, a light homogenization mechanism 24, and a back frame 23. The back frame 23 carries the light source 25 and the light homogenization mechanism 24. When the backlight system 21 is an edge lighting type, the light homogenization mechanism 24 is a light guide; and when the backlight system 21 is a direct type, the light homogenization mechanism 24 is a diffuser plate. The back frame 23 comprises at least a first primary assembling piece and a second primary assembling piece, and the two of at least a first and second primary assembling pieces constitute a main frame structure 27 of the back frame 23.

Referring also to FIG. 3, the back frame 23 of the first embodiment comprises a first primary assembling piece 261 and a second primary assembling piece 262. The first primary assembling piece 261 has an end joined to an end of the second primary assembling piece 262, and the first primary assembling piece 261 has another end joined to another end of the second primary assembling piece 262 in order to form the main frame structure 27 of the back frame 23. The first primary assembling piece 261 and the second primary assembling piece 262 are both aluminum pieces or galvanized steel pieces. In the instant embodiment, the first primary assembling piece 261 and the second primary assembling piece 262 are L-shaped.

Figure 4:
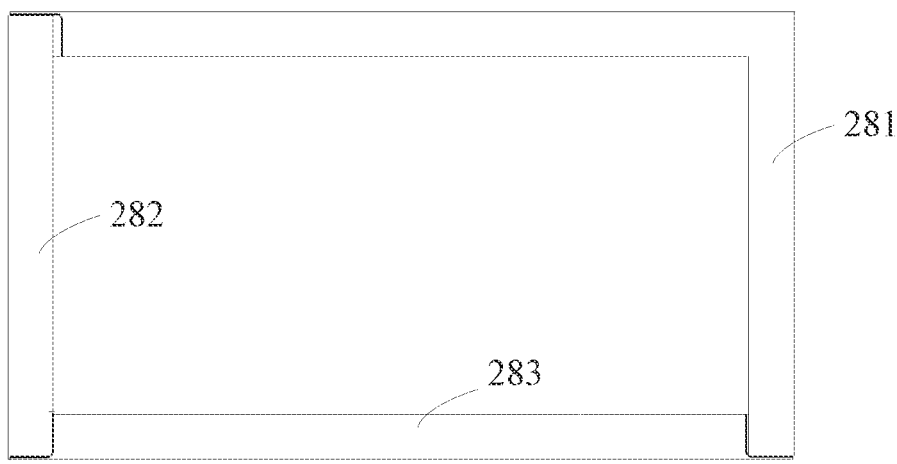
FIG. 4 is a schematic view showing a back frame of a flat panel display device according to a third embodiment of the present invention.

Referring also to FIG. 4, the back frame 23 of a second embodiment comprises a first primary assembling piece 281, a second primary assembling piece 282, and a third primary assembling piece 283. The three primary assembling pieces 281, 282, and 283 are assembled and joined to form a main frame structure 27 of the back frame 23. The three primary assembling pieces 281, 282, and 283 are all aluminum pieces or galvanized steel pieces. In the instant embodiment, the first primary assembling piece 281 is L-shaped, and the second and third primary assembling pieces 282, 283 are straight linear.

Further, the back frame 23 further comprises secondary assembling pieces arranged inside and joined to the main frame structure 27.

A detailed description will be given to the back frame 23 of the flat panel display device 20 according to the present invention, which comprises four primary assembling pieces and two secondary assembling pieces.

Figure 5:
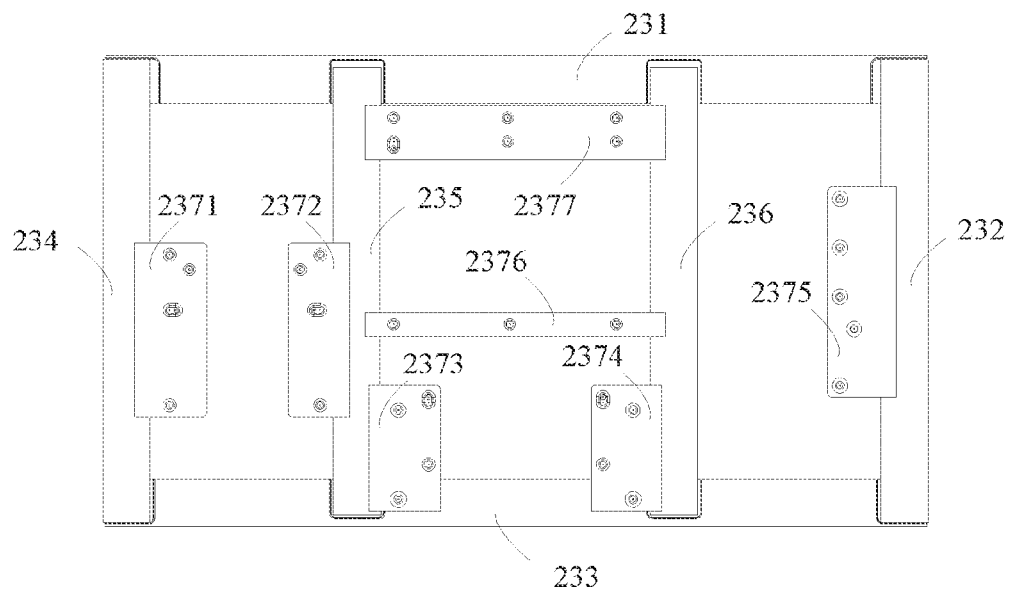
FIG. 5 is a schematic view showing a back frame of a flat panel display device according to a fourth embodiment of the present invention.

Referring to FIG. 5, FIG. 5 is a schematic view showing a back frame of flat panel display device according to a fourth embodiment of the present invention. As shown in FIG. 5, in the instant embodiment, a back frame 23 comprises: a first primary assembling piece 231, a second primary assembling piece 232, a third primary assembling piece 233, a fourth primary assembling piece 234, a first secondary assembling piece 235, a second secondary assembling piece 236, and bracing pieces 2371, 2372, 2373, 2374, 2375, 2376, and 2377. The first primary assembling piece 231, the second primary assembling piece 232, the third primary assembling piece 233, and the fourth primary assembling piece 234 are successively joined to each other in an end-to-end manner to constitute a rectangular main frame structure 27 of the back frame 23. The first secondary assembling piece 235 and the second secondary assembling piece 236, serving as ancillary assembling pieces, are arranged in the main frame structure 27 and joined to the main frame structure 27.

Specifically, an end of the first primary assembling piece 231 is joined to an end of the second primary assembling piece 232, another end of the second primary assembling piece 232 is joined to an end of the third primary assembling piece 233, another end of the third primary assembling piece 233 is joined to an end of the fourth primary assembling piece 234, and another end of the fourth primary assembling piece 234 is joined to another end of the first primary assembling piece 231 in order to form the rectangular main frame structure 27. The first primary assembling piece 231, the second primary assembling piece 232, the third primary assembling piece 233, and the fourth primary assembling piece 234 are all aluminum pieces or galvanized steel pieces. In the instant embodiment, the first primary assembling piece 231, the second primary assembling piece 232, the third primary assembling piece 233, and the fourth primary assembling piece 234 are straight linear, yet in other embodiments, it is apparent to those skilled in the art to make all the first primary assembling piece 231, the second primary assembling piece 232, the third primary assembling piece 233, and the fourth primary assembling piece 234 L-shaped, or some being straight linear and the remaining being L-shaped. For example, in FIG. 3, the first primary assembling piece 261 and the second primary assembling piece 262 are both L-shaped; in FIG. 4, the first primary assembling piece 281 is L-shaped, while the second and third primary assembling pieces 282 and 283 are straight linear.

Figure 6:
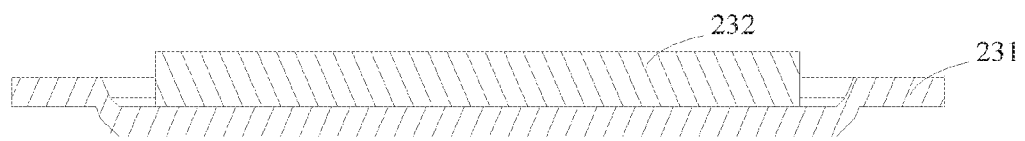
FIG. 6 is a schematic view showing a joining structure of a flat panel display device according to a fifth embodiment of the present invention.

In the instant embodiment, the back frame 23 of the flat panel display device 20 is formed by joining connection. As shown in FIG. 6, an illustrative example is given for the connection of an end of the first primary assembling piece 231 to an end of the second primary assembling piece 232, wherein the end of the second primary assembling piece 232 is joined to the end of the first primary assembling piece 231 by means of for example screwing, fastening, or welding, to have the end of the second primary assembling piece 232 connected to the end of the first primary assembling piece 231.

Figure 7:
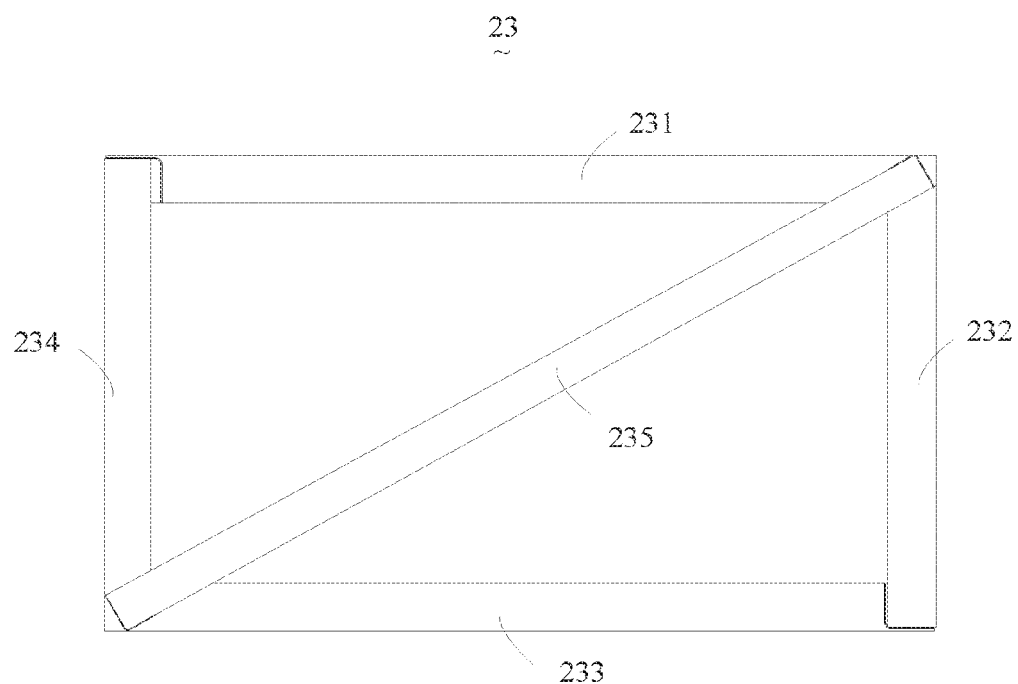
FIG. 7 is a schematic view showing a diagonally-arranged first secondary assembling piece mounted to a main frame structure of a flat panel display device according to a sixth embodiment of the present invention.
Figure 8:
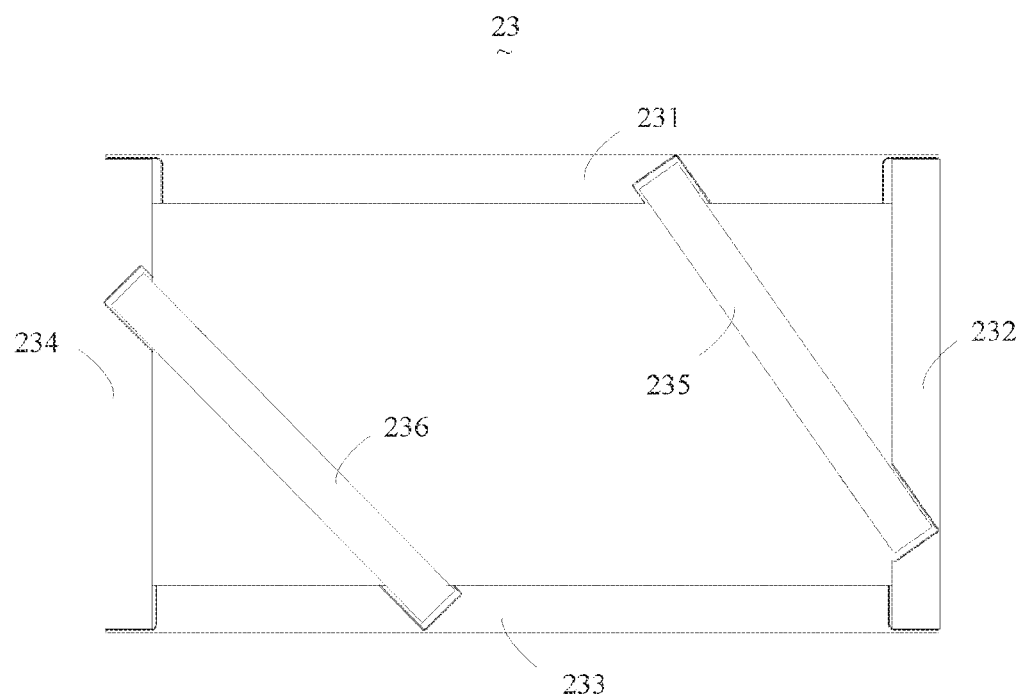
FIG. 8 is a schematic view showing a first secondary assembling piece and a second secondary assembling piece mounted to a main frame structure of a flat panel display device according to a seventh embodiment of the present invention.

In the instant embodiment, the first secondary assembling piece 235 and the second secondary assembling piece 236 are arranged in the main frame structure 27 of the back frame 23. An end of the first secondary assembling piece 235 is joined to the first primary assembling piece 231 and another end of the first secondary assembling piece 235 is joined to the third primary assembling piece 233; and an end of the second secondary assembling piece 236 is joined to the first primary assembling piece 231 and another end of the second secondary assembling piece 236 is joined to the third primary assembling piece 233. Further, the second primary assembling piece 232, the fourth primary assembling piece 234, the first secondary assembling piece 235, and the second secondary assembling piece 236 are arranged parallel to each other. In other embodiments, those skilled in the art may arrange at least one secondary assembling piece in the main frame structure 27. For example, only the first secondary assembling piece 235 is arranged in the main frame structure 27. Further, the two ends of the first secondary assembling piece 235 can be selectively joined to at least two of the primary assembling pieces of the first primary assembling piece 231, the second primary assembling piece 232, the third primary assembling piece 233, and the fourth primary assembling piece 234. For example, the first secondary assembling piece 235 is set diagonally in the main frame structure 27, as shown in FIG. 7. Similarly, the two ends of the second secondary assembling piece 236 can be selectively joined to at least two of the primary assembling pieces of the first primary assembling piece 231, the second primary assembling piece 232, the third primary assembling piece 233, and the fourth primary assembling piece 234. For example, the two ends of the first secondary assembling piece 235 are respectively joined to the first primary assembling piece 231 and the second primary assembling piece 232 that are adjacent to each other and the two ends of the second secondary assembling piece 236 are respectively joined the third primary assembling piece 233 and the fourth primary assembling piece 234 that are adjacent to each other, as shown in FIG. 8.

In the instant embodiment, the back frame 23 comprises seven bracing pieces 2371, 2372, 2373, 2374, 2375, 2376, and 2377. The bracing piece 2371 is fixed to the fourth primary assembling piece 234; the bracing pieces 2372, 2373 are both fixed to the first secondary assembling piece 235; the bracing piece 2374 is fixed to the second secondary assembling piece 236; the bracing piece 2375 is fixed to the second primary assembling piece 232; and the bracing pieces 2376, 2377 are each fixed, at two ends thereof, to the first secondary assembling piece 235 and the second secondary assembling piece 236. In practice, the bracing pieces can be fixed to one or more of the first primary assembling piece 231, the second primary assembling piece 232, the third primary assembling piece 233, the fourth primary assembling piece 234, the first secondary assembling piece 235, and the second secondary assembling piece 236. In other embodiments, those skilled in the art may mount bracing pieces of any other numbers to the back frame 23, such as one or more bracing pieces. Further, the bracing pieces can be releasably fixed to one or more of the first primary assembling piece 231, the second primary assembling piece 232, the third primary assembling piece 233, the fourth primary assembling piece 234, the first secondary assembling piece 235, and the second secondary assembling piece 236.

The bracing pieces 2371, 2372, 2373, 2374, 2375, 2376, and 2377 may be provided with bumps (not labeled) so that the back frame 23 may fix components, such as circuit boards, with such bumps.

Molds for making the back frame 23 will be described. In the instant embodiment, the first primary assembling piece 231 and the third primary assembling piece 233 are of the same size and shape so that they can be made by stamping with the same mold. The second primary assembling piece 232, the fourth primary assembling piece 234, the first secondary assembling piece 235, and the second secondary assembling piece 236 are of the same size and shape so that they can be made by stamping with the same mold, making it possible to share the mold. Thus, the back frame 23 of the present invention can be made by stamping with only two small-sized molds, and compared to the conventional back frame 10 that requires a large-sized mold, the molds for making the back frame 23 of the present invention are simple in structure and small in size and thus the cost of mold for the back frame 23 can be lowered. Further, compared to the whole back frame structure of the conventional back frame 10, the back frame 23 of the present invention can significantly save material used and thus reduce the manufacturing cost of the flat panel display device 20.

Figure 9:
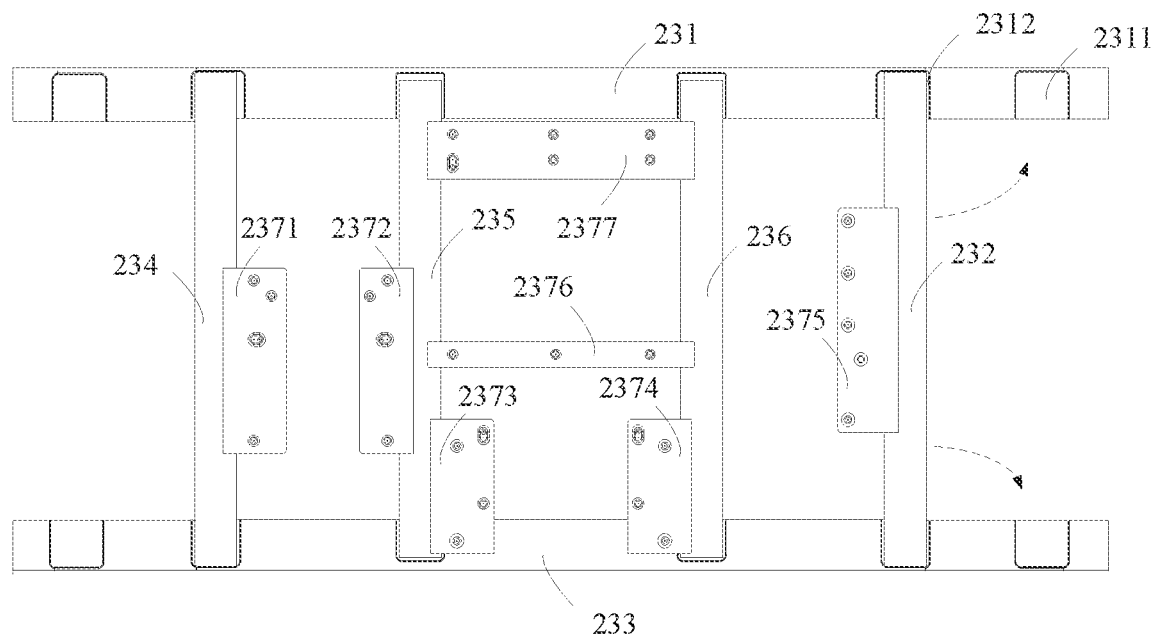
FIG. 9 is a schematic view showing joint sections of a back frame of a flat panel display device according to an eighth embodiment of the present invention.

Referring to FIG. 9, FIG. 9 is a schematic view showing joint sections of a back frame of a flat panel display device according to an eighth embodiment of the present invention. As shown in FIG. 9, in the instant embodiment, an end of the first primary assembling piece is provided with two joint sections, and the joint sections have a structure mating an end of the second primary assembling piece so that the first primary assembling piece can be joined to a corresponding end of the second primary assembling piece.

Figure 10:
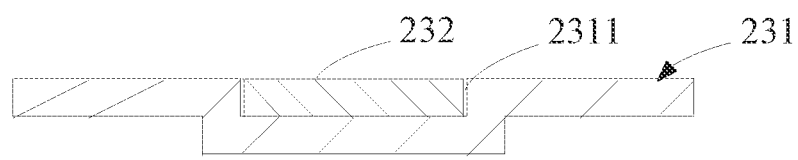
FIG. 10 is a cross-sectional view showing a first example of joint section of FIG. 9.

Specifically, the first primary assembling piece 231 has an end forming joint sections 2311, 2312, and the joint sections 2311, 2312 are arranged in a spaced manner in a lengthwise direction of the first primary assembling piece 231. The joint sections 2311, 2312 are formed by forming recesses having a shape mating an end of the second primary assembling piece 232 in the first primary assembling piece 231 in order to receive the end of the second primary assembling piece 232 therein. As shown in FIG. 10, the joint sections 2311, 2312 are recesses that do not extend through opposite surfaces of the end of the first primary assembling piece 231 and the recesses are of a rectangular shape with the second primary assembling piece 232 being straight linear.

Figure 11:
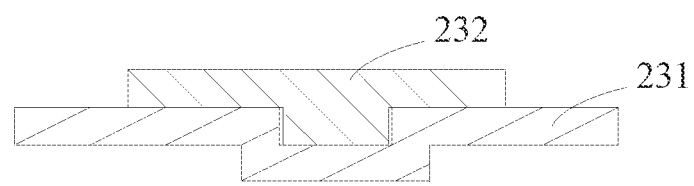
FIG. 11 is a schematic view showing a joining structure of a joint section of a back frame of a flat panel display device according to a ninth embodiment of the present invention.

To assemble a large-sized back frame 23, the joint section 2311 that is close to the very end of the first primary assembling piece 231 is first taken and a second primary assembling piece 232 having a corresponding width is selected. Afterwards, an end of the second primary assembling piece 232 is positioned in the recess of the joint section 2311. And then, means, such as screwing, fastening, or welding, is applied to join and fix the end of the second primary assembling piece 232 to the joint section 2311. To assemble a small-sized back frame 23, the joint section 2312 that is distant from the very end of the first primary assembling piece 231 is first chosen and a second primary assembling piece 232 having a corresponding width is selected. Afterwards, an end of the second primary assembling piece 232 is positioned in the recess of the joint section 2312. And then, means, such as screwing, fastening, or welding, is applied to join and fix the end of the second primary assembling piece 232 to the joint section 2312. Specifically, for example the second primary assembling piece 232 forms a protrusion at a corresponding location on a surface thereof, and the protrusion of the second primary assembling piece 232 is embedded in the recess the first primary assembling piece 231 at a corresponding location in order to join the first primary assembling piece 231 and the second primary assembling piece 232, as shown in FIG. 11. Further, the second primary assembling piece 232 may form, on one end thereof, at least two protrusions that are spaced in the lengthwise direction of the second primary assembling piece 232, such as two, three, or four protrusions.

Figure 12:
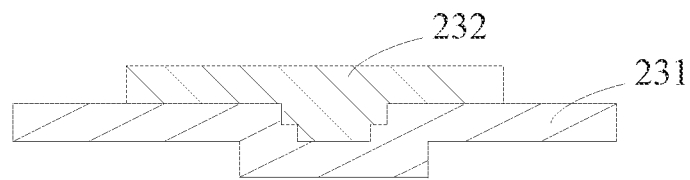
FIG. 12 is a schematic view showing a joining structure of a joint section of a back frame of a flat panel display device according to a tenth embodiment of the present invention.
Figure 13:
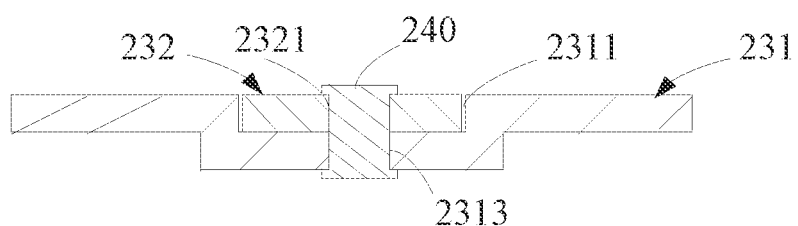
FIG. 13 is a schematic view showing a joining structure of a joint section of a back frame of a flat panel display device according to an eleventh embodiment of the present invention.

Furthermore, the recess of the first primary assembling piece 231 can be a recess of a multi-stepped configuration and the second primary assembling piece 232 forms, at a corresponding location, a protrusion having a multi-stepped configuration corresponding to the recess, as shown in FIG. 12. Further, as shown in FIG. 13, taking the joint section 2311 as an example, the recess of the first primary assembling piece 231 forms, in a bottom thereof, a first through hole 2313, and the second primary assembling piece 232 forms, at a location corresponding to the joint section 2311, a second through hole 2321. The back frame 23 further comprises a fastener 240. The fastener 240 extends through the first through hole 2313 and the second through hole 2321 to joint the first primary assembling piece 231 and the second primary assembling piece 232 to each other.

Figure 14:
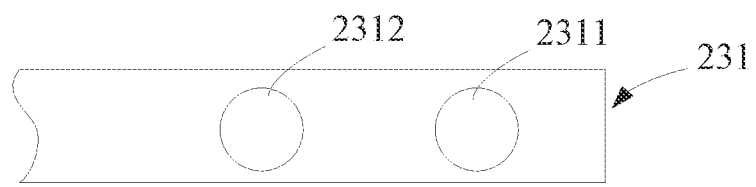
FIG. 14 is a schematic view showing a joint section of a back frame of a flat panel display device according to a twelfth embodiment of the present invention.

As shown in FIG. 14, in another embodiment of the back frame of flat panel display device according to the present invention, the recesses of the joint sections 2311, 2312 of the first primary assembling piece 231 are of a circular shape. Yet, in other embodiments, those skilled in the art may arrange the shape of the recesses to be other polygonal configurations, such as triangle.

Figure 15:
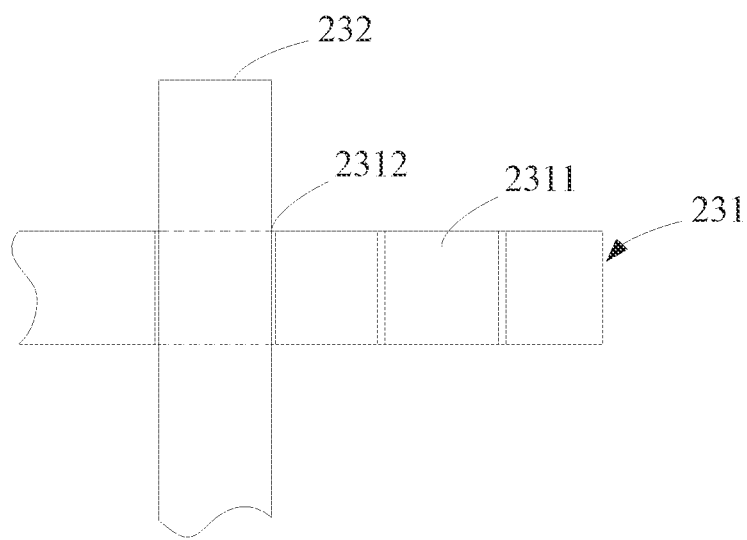
FIG. 15 is a schematic view showing a joint section of a back frame of a flat panel display device according to a thirteenth embodiment of the present invention.

As shown in FIG. 15, in another embodiment of the back frame of flat panel display device according to the present invention, the joint sections 2311, 2312 are recesses that do not extend through opposite surfaces of the first primary assembling piece 231, whereby an end of the second primary assembling piece 232 is movable within the joint sections 2311, 2312. For example, after the end of the second primary assembling piece 232 is set extending beyond and joined and fixed to the joint section 2312, the portion of extension is then trimmed off so that the length of the second primary assembling piece 232 that serves as a primary assembling piece of the back frame can be adjusted.

In a practical application, the other end of the first primary assembling piece 231 and both ends of the third primary assembling piece 233 are all provided with two joint sections having a structure identical to that of the joint sections 2311, 2312. The ends of the second primary assembling piece 232 and the ends of the fourth primary assembling piece 234 may be subjected to specific designs or no design at all according to the application. For example:

(1) In a first situation, as shown in FIG. 10, the two ends of the second primary assembling piece 232 and the two ends of the fourth primary assembling piece 234 are of no specific design. In other words, the ends are of the same structure as the remaining portions. Under this condition, in making a join with a selected joint section 2311 (2312) at one end of the first primary assembling piece 231 (the same applicable to the other end), if an attempt is made to change the width of the back frame 23, then the length of the corresponding second primary assembling piece 232 and fourth primary assembling piece 234 must be selected accordingly. Namely, if the joint section 2311 that is close to the very end of the first primary assembling piece 231 is selected for joining, then no trimming is applied to the second primary assembling piece 232 and the fourth primary assembling piece 234 or the portion that is trimmed off is short; if the joint section 2312 that is distant from the very end of the first primary assembling piece 231 is selected for joining, then the second primary assembling piece 232 and the fourth primary assembling piece 234 are trimmed and the trimmed portion being long or short is according to the distance that the joint section is from the very end of the first primary assembling piece 231 being great or small; and (2) In a second situation, it is similar to the first situation, but as shown in FIG. 11, the second primary assembling piece 232 and the fourth primary assembling piece 234 use different protrusions to respectively mate the first primary assembling piece 231 and the third primary assembling piece 233 in order to realize change of width of the back frame 23; similarly, if a joint section 2312 other than the first joint section 2311 that is close to the very end of the first primary assembling piece 231 is selected for joining, then before or after joining, excessive portions of the second primary assembling piece 232 and the fourth primary assembling piece 234 may be trimmed off.

This also applicable to a main frame structure 27 of the back frame 23 that is formed by joining two L-shaped primary assembling pieces.

In the present invention, the other end of the first primary assembling piece 231 and both ends of the third primary assembling piece 233 are all provided with two joint sections having a structure identical to that of the joint sections 2311, 2312. In other words, the first primary assembling piece is provided with at least two joint sections. Repeated description will be omitted herein.

In summary, the present invention provides a back frame 23 having a first primary assembling piece that is provided with at least two joint sections. The number of the joint section can be selected according to the requirement of customers. In the instant embodiment, a description is given to an example comprising two joint sections 2311, 2312. Thus, to prepare the molds for making the back frame 23, only two sets of mold are needed, namely one mold for a first primary assembling piece and the other mold for a second primary assembling piece. The first primary assembling piece may be provided with a plurality of joint sections for joining operation in order to form various sizes for the back frame 23. To assemble the back frame 23, based on the desired size of the back frame 23, the corresponding one of the joint sections is selected. With the joint section, the second primary assembling piece is joined to the joint section of the first primary assembling piece and the other joint section of the first primary assembling piece that is located outward of the joining location of the second primary assembling piece is trimmed off to obtain a desired size of the back frame 23. Compared to the conventional technology that requires different back frame molds for making different sizes of back frame 10, the back frame of the flat panel display device 23 according to the present invention requires only a mold for the first primary assembling piece and a mold for the second primary assembling piece 28 so that mold sharing among various sizes of product can be realized and the molds used are of simple structures, allowing of reduction of expenditure of the molds for back frames.

The present invention also provides a mold for making a back frame of flat panel display device. The back frame mold is provided with a main pattern for forming a primary assembling piece of the back frame and the main pattern comprises a sub-pattern that forms at least two joint sections on an end of the primary assembling piece. The primary assembling piece comprises the previously discussed first primary assembling piece and second primary assembling piece, corresponding to the above mentioned main pattern; and the joint section comprises the previously discussed joint section of the first primary assembling piece, corresponding to the above mentioned sub-pattern. Repeated description is omitted herein.

Besides providing at least two joint sections at one end of the first primary assembling piece with each joint section having a structure that mates a corresponding end of the second primary assembling piece in order to realize adjustment of the size of the main frame structure, it is also possible to adjust the size of the main frame structure by providing a plurality of sub-assembling pieces on the primary assembling pieces.

Figure 16:
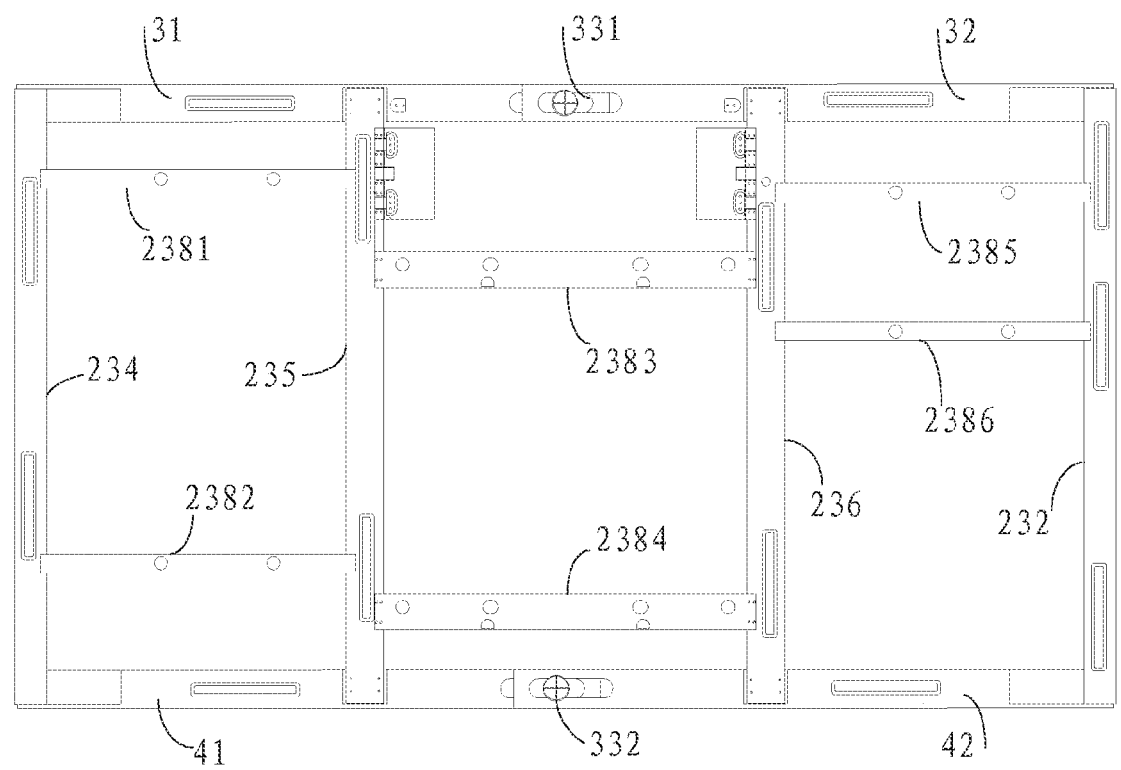
FIG. 16 is a schematic view showing a structure for adjusting a size of back frame of flat panel display device according to a fourteenth embodiment of the present invention.

As shown in FIG. 16, the main frame structure comprises a first primary assembling piece, a second primary assembling piece, a third primary assembling piece, and a fourth primary assembling piece. The first primary assembling piece comprises a first sub-assembling piece 31 and a second sub-assembling piece 32. The third primary assembling piece comprises a third sub-assembling piece 41 and a fourth sub-assembling piece 42. The back frame also comprises a first secondary assembling piece 235, a second secondary assembling piece 236, and bracing pieces 2381, 2382, 2383, 2384, 2385, 2386.

In FIG. 16, the main frame structure further comprises an adjustment zone 331 for adjusting the length of the primary assembling piece. The length of the first primary assembling piece is adjusted by means of the adjustment zone 331 and specifically, this is realized through adjusting relative positions of the first sub-assembling piece 31 and the second sub-assembling piece 32. The length of the third primary assembling piece is adjusted by means of an adjustment zone 332, and specifically, this is realized through adjusting relative positions of the third sub-assembling piece 41 and the fourth sub-assembling piece 42.

Certainly, in various embodiments, the lengths of the primary assembling pieces, the lengths of the secondary assembling pieces, and the lengths of the bracing pieces are all realized through coupling of two or more sub-assembling piece, namely the corresponding lengths are adjustable.

Figure 17:
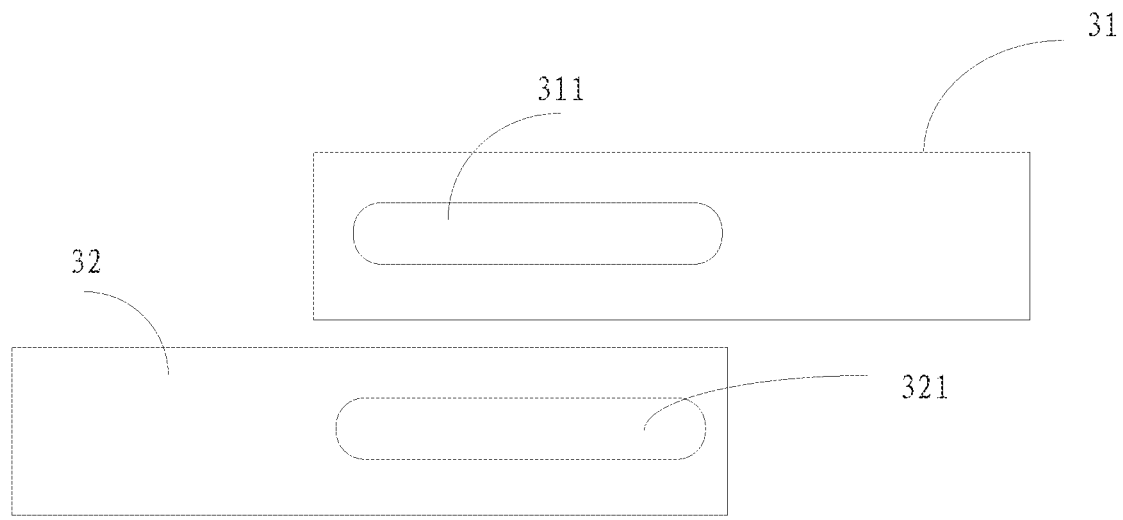
FIG. 17 is an exploded view showing a structure for adjusting a size of back frame of flat panel display device according to a fifteenth embodiment of the present invention.
Figure 18:
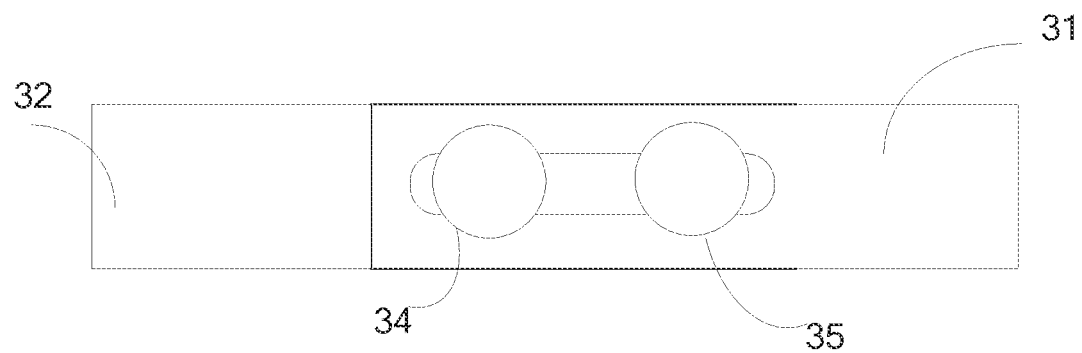
FIG. 18 is a plan view showing a structure for adjusting a size of back frame of flat panel display device according to a sixteenth embodiment of the present invention.
Figure 19:
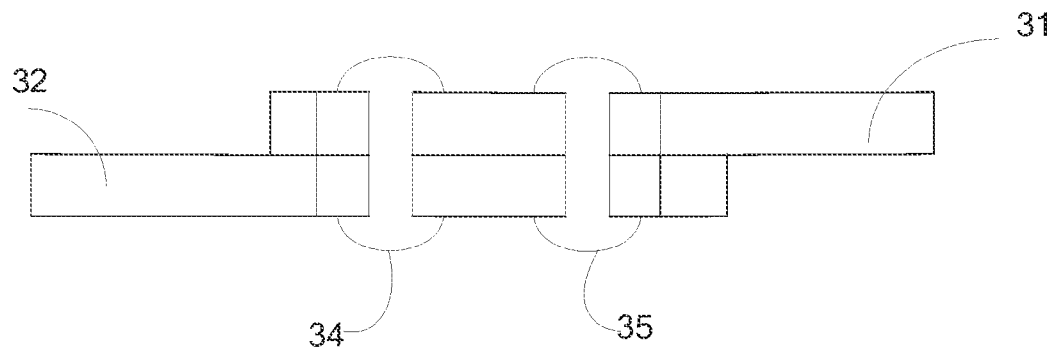
FIG. 19 is a cross-sectional view showing a structure for adjusting a size of back frame of flat panel display device according to a seventeenth embodiment of the present invention.

A specific way of adjustment is as follows: As shown in FIGS. 17, 18, and 19, the first sub-assembling piece 31 has an end forming a first slit 311 extending in a lengthwise direction of the first sub-assembling piece 31; the second sub-assembling piece 32 has an end forming a second slit 321 extending in a lengthwise direction of the second sub-assembling piece 32. Also, the back frame comprises a first fastener 34 and a second fastener 35. The first fastener 34 extends through both the first slit 311 and the second slit 321 to join the first sub-assembling piece 31 and the second sub-assembling piece 32; the second fastener 35 extends through the first slit 311 and the second slit 321 to join the first sub-assembling piece 31 and the second sub-assembling piece 32.

FIGS. 18 and 19 are respectively a plan view and a cross-sectional view illustrating the first sub-assembling piece 31 and the second sub-assembling piece 32 joined together. The joining can be realized through screwing or riveting. As shown in the drawing, the joining is realized through riveting. In other embodiments, the joining can be done with welding. For welding or some riveting operations, the first fastener 34 and the second fastener 35 can be omitted.

In other embodiments, on the basis of simultaneously using other fastening means, it is possible to use a fastener to join the first sub-assembling piece 31 and the second sub-assembling piece 32.

Figure 20:
FIG. 20 is an exploded view showing a structure for adjusting a size of back frame of flat panel display device according to an eighteenth embodiment of the present invention.
Figure 21:
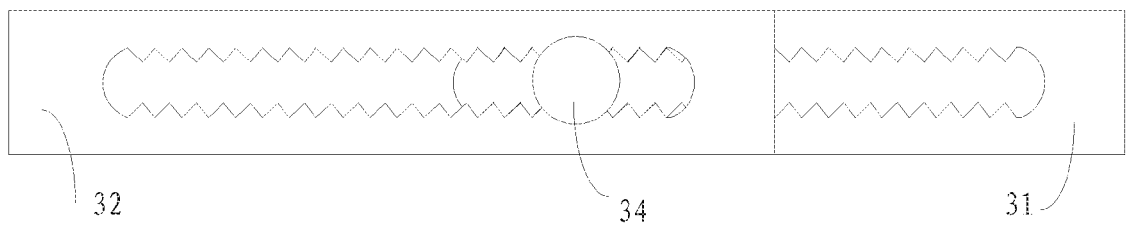
FIG. 21 is a plan view showing a structure for adjusting a size of back frame of flat panel display device according to a nineteenth embodiment of the present invention.

The embodiments of the present invention provide various ways of adjusting the size of back frame. For example:

As shown in FIGS. 20 and 21 the first slit 311 has two side walls between which the distance is periodically variable in the direction of the first slit to form a plurality of alternating wide spaces and narrow spaces. The wide spaces mate the size of the first fastener 34, and the narrow spaces are smaller than the size of the first fastener 34. The second slit 321 has two side walls between which the distance is periodically variable in the direction of the second slit to form a plurality of alternating wide spaces and narrow spaces. The wide spaces mate the size of the first fastener 34, and the narrow spaces are smaller than the size of the first fastener 34. The first fastener 34 is put through both the first slit 311 and the second slit 321 to join the first sub-assembling piece 31 and the second sub-assembling piece 32.

FIG. 21 is a plan view showing the first sub-assembling piece 31 and the second sub-assembling piece 32 that are joined.

In other embodiment, it is possible to use more than two fasteners to join the first sub-assembling piece 31 and the second sub-assembling piece 32.

Figure 22:
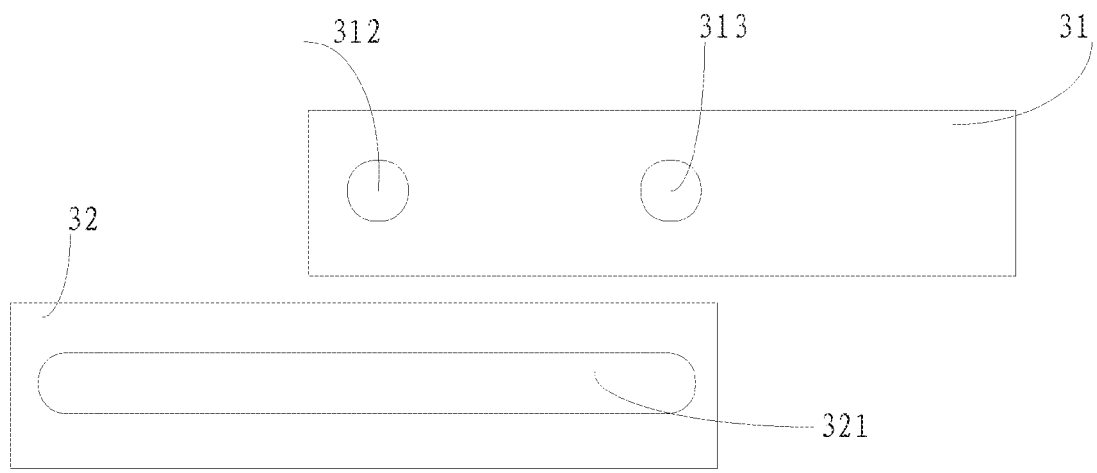
FIG. 22 is an exploded view showing a structure for adjusting a size of back frame of flat panel display device according to a twentieth embodiment of the present invention.
Figure 23:
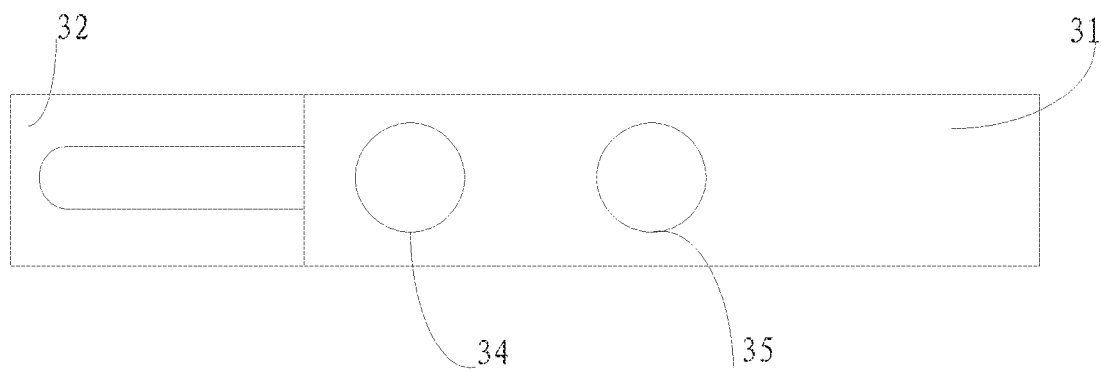
FIG. 23 is a plan view showing a structure for adjusting a size of back frame of flat panel display device according to a twenty-first embodiment of the present invention.
Figure 24:
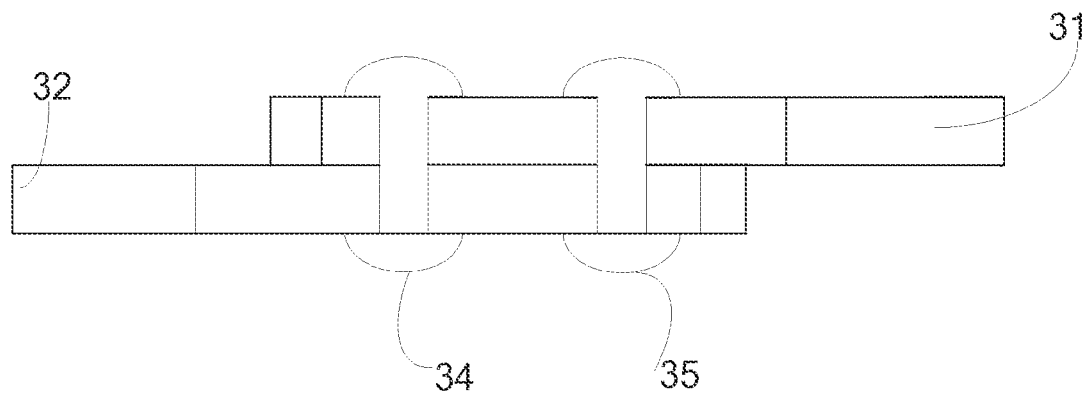
FIG. 24 is a cross-sectional view showing a structure for adjusting a size of back frame of flat panel display device according to a twenty-second embodiment of the present invention.

It is also possible to realize the adjustment of the size of the back frame through what illustrated in FIGS. 22, 23, and 24. The first sub-assembling piece 31 has an end that forms a first through hole 312 and a second through hole 313 that are spaced in a lengthwise of the first sub-assembling piece 31. The second sub-assembling piece 32 has an end forming a second slit 321 that extends in the lengthwise direction of the second sub-assembling piece 32. The second slit 321 has a length that is greater than the spacing distance between the first through hole 312 and the second through hole 313.

A first fastener 34 is put through the first through hole 312 and the second slit 321 to join the first sub-assembling piece 31 and the second sub-assembling piece 32, and a second fastener 35 is put through the second through hole 313 and the second slit 321 to join the first sub-assembling piece 31 and the second sub-assembling piece 32. FIGS. 23 and 24 are, respectively, a plan view and a cross-sectional view showing the first sub-assembling piece 31 and the second sub-assembling piece 32 that are joined.

Figure 25:
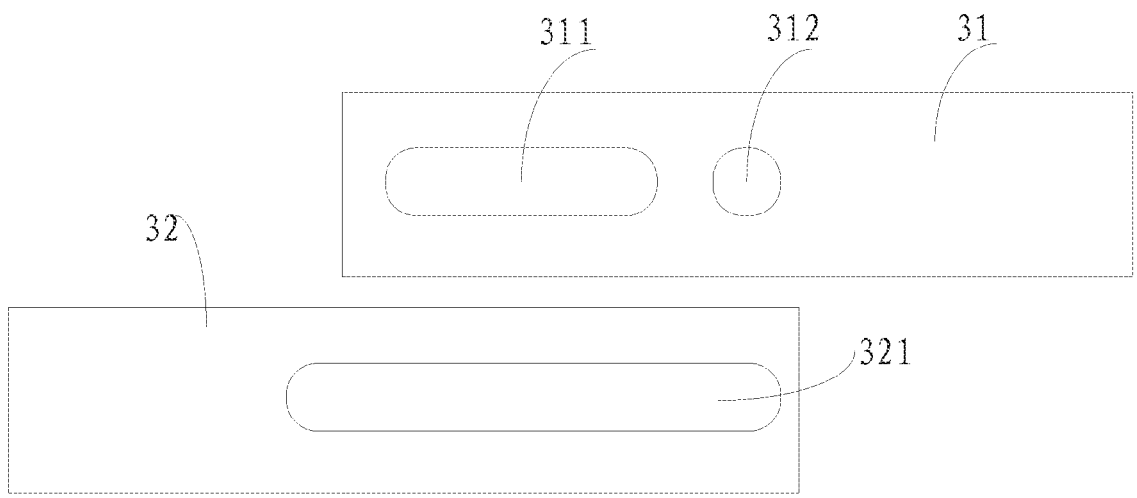
FIG. 25 is an exploded view showing a structure for adjusting a size of back frame of flat panel display device according to a twenty-third embodiment of the present invention.
Figure 26:
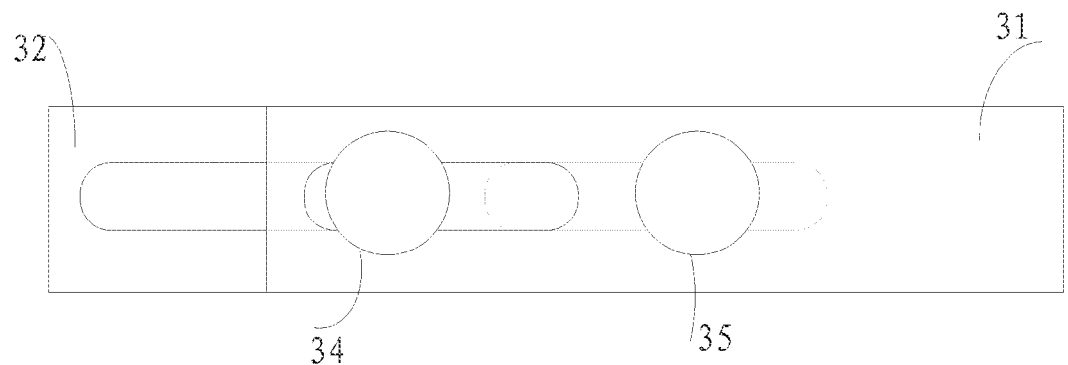
FIG. 26 is a plan view showing a structure for adjusting a size of back frame of flat panel display device according to a twenty-fourth embodiment of the present invention.
Figure 27:
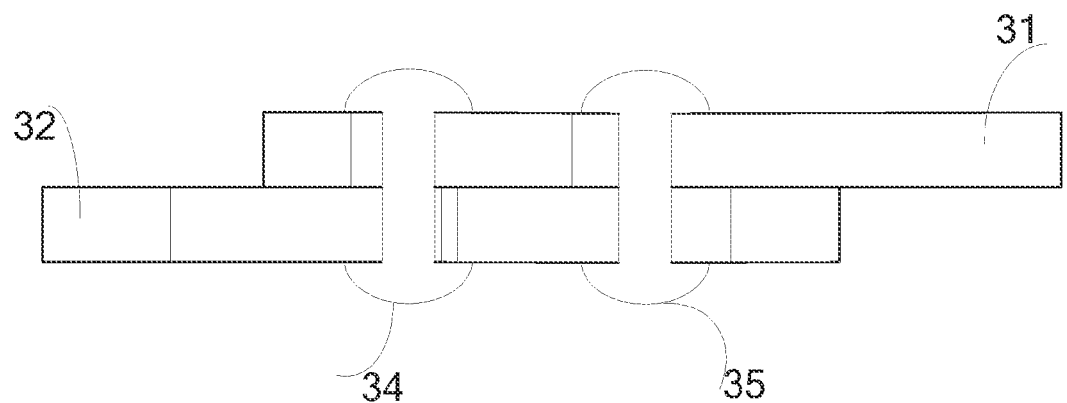
FIG. 27 is a cross-sectional view showing a structure for adjusting a size of back frame of flat panel display device according to a twenty-fifth embodiment of the present invention.

It is also possible to realize the adjustment of the size of the back frame through what illustrated in FIGS. 25, 26, and 27. The first sub-assembling piece 31 has an end that forms a first through hole 312 and a first slit 311 that are spaced in a lengthwise of the first sub-assembling piece 31 and the first slit 311 extends in the lengthwise direction of the first sub-assembling piece 31. The second sub-assembling piece 32 has an end forming a second slit 321 that extends in the lengthwise direction of the second sub-assembling piece 32. The second slit 321 has a length that is greater than the spacing distance between the first through hole 312 and the first slit 311.

A first fastener 34 is put through the first through hole 312 and the second slit 321 to join the first sub-assembling piece 31 and the second sub-assembling piece 32, and a second fastener 35 is put through the first slit 311 and the second slit 321 to join the first sub-assembling piece 31 and the second sub-assembling piece 32. FIGS. 26 and 27 are, respectively, a plan view and a cross-sectional view showing the first sub-assembling piece 31 and the second sub-assembling piece 32 that are joined.

Figure 28:
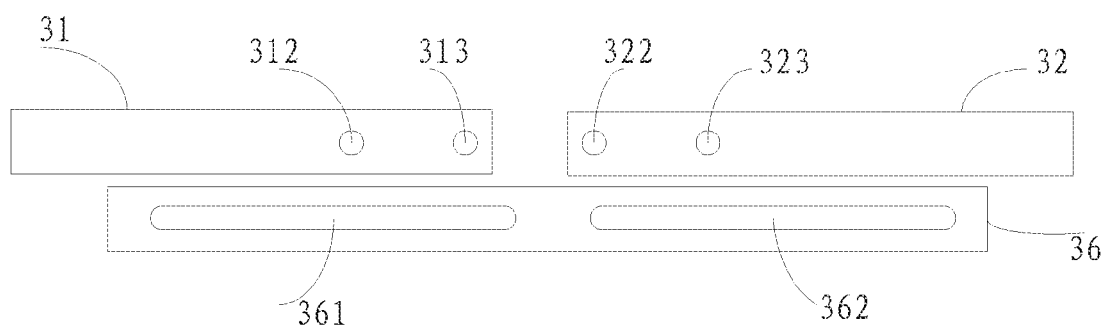
FIG. 28 is an exploded view showing a structure for adjusting a size of back frame of flat panel display device according to a twenty-sixth embodiment of the present invention.
Figure 29:
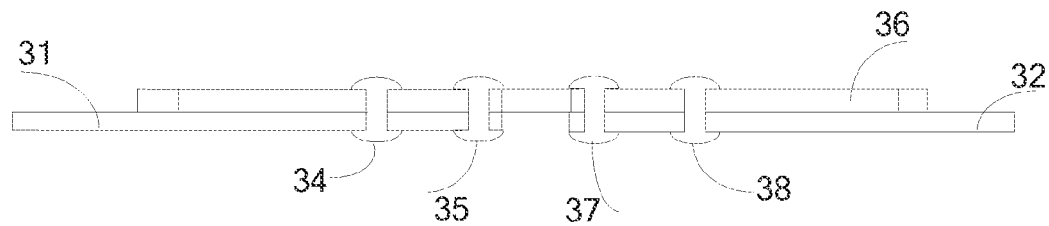
FIG. 29 is a plan view showing a structure for adjusting a size of back frame of flat panel display device according to a twenty-seventh embodiment of the present invention.

As shown in FIGS. 28 and 29, the length-adjustable primary assembling piece comprises a first sub-assembling piece 31, a second sub-assembling piece 32, and an intermediate assembling piece 36. The first sub-assembling piece 31 has an end forming a first through hole 312 and a second through hole 313 that are spaced in a lengthwise direction of the first sub-assembling piece 31. The second sub-assembling piece 32 has an end forming a third through hole 322 and a fourth through hole 323 that are spaced in a lengthwise direction of the second sub-assembling piece 32. The intermediate assembling piece 36 forms a third slit 361 and a fourth slit 362 that are spaced in a lengthwise direction of the intermediate assembling piece 36.

A first fastener 34 is put through the first through hole 312 and the third slit 361 to join the first sub-assembling piece 31 and an end of the intermediate assembling piece 36, and a second fastener 35 is put through the second through hole 313 and the third slit 361 to join the first sub-assembling piece 31 and the end of the intermediate assembling piece 36. A third fastener 37 is put through the third through hole 322 and the fourth slit 362 to join the second sub-assembling piece 32 and another end of the intermediate assembling piece 36, and similarly, a fourth fastener 35 is put through the fourth through hole 323 and the fourth slit 362 to join the second sub-assembling piece 32 and said another end of the intermediate assembling piece 36.

FIG. 29 is a cross-sectional view showing the first sub-assembling piece 31 and the second sub-assembling piece 32 that are joined.

In other embodiments, the first sub-assembling piece and the second sub-assembling piece may form a plurality of through holes that is spaced in lengthwise directions thereof. Fasteners may be put through the through holes at different locations to join the first sub-assembling piece and the second sub-assembling piece. The joining can be carried out with screwing or riveting and there may be two or more points of screwing or points of riveting.

In other embodiments, to allow fast positioning and mating between the first sub-assembling piece and the second sub-assembling piece in a jointing process, a specific way of operation is that the first sub-assembling piece forms a slide slot in a lengthwise direction of the first sub-assembling piece and the second sub-assembling piece forms a slide track in a lengthwise direction of the second sub-assembling piece. The slide slot and the slide track may mate each other to facilitate the joining of the first sub-assembling piece and the second sub-assembling piece.

As described above, various ways may be adopted to change the size of the main frame structure and the sub-assembling pieces that are joined may be two or more in quantity. The way of joining can be screwing, riveting, or welding. Every constituent component of the main frame structure can adjust the size through the above ways.

Figure 30:
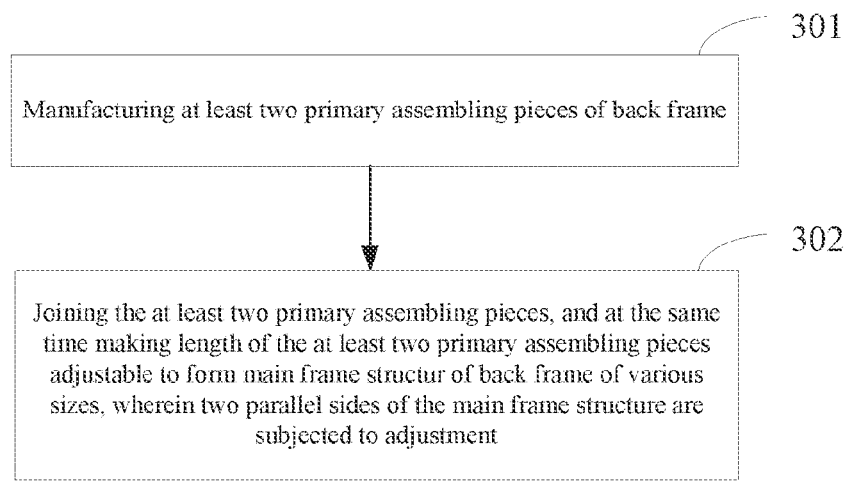
FIG. 30 is a flow chart showing a method for manufacturing a back frame of a flat panel display device according to a twenty-eighth embodiment of the present invention.

As shown in FIG. 30, the present invention also provides a method for making a back frame of flat panel display device. The method comprises the following steps:

Step 301: manufacturing at least two primary assembling pieces of back frame;

Step 302: joining the at least two primary assembling pieces, in which lengths of the at least two primary assembling pieces are adjustable in order to form a main frame structure of the back frame having various sizes, wherein length adjustment is carried out on two parallel sides of the main frame structure.

The step of manufacturing at least two primary assembling pieces of back frame comprises: manufacturing at least first and second primary assembling pieces, in which the first primary assembling piece has an end forming at least two joint sections, each of the joint sections having a structure that mates a corresponding end of the second primary assembling piece.

The step of joining the at least two primary assembling pieces comprises: selecting one joint section of the at least two joint sections according to a size of the back frame to join the corresponding end of the second primary assembling piece.

In the instant embodiment, when other joint sections are present between the joining location of the second primary assembling piece and the end of the first primary assembling piece, before or after the step of selecting one joint section of the at least two joint sections according to a size of the back frame to join the corresponding end of the second primary assembling piece, the other joint sections of the first primary assembling piece that are located outward of the joining position of the second primary assembling piece are trimmed off. The first primary assembling piece comprises the previously discussed first primary assembling piece, and the second primary assembling piece comprises the previously discussed second primary assembling piece, and repeated description will be omitted herein.

Figure 31:
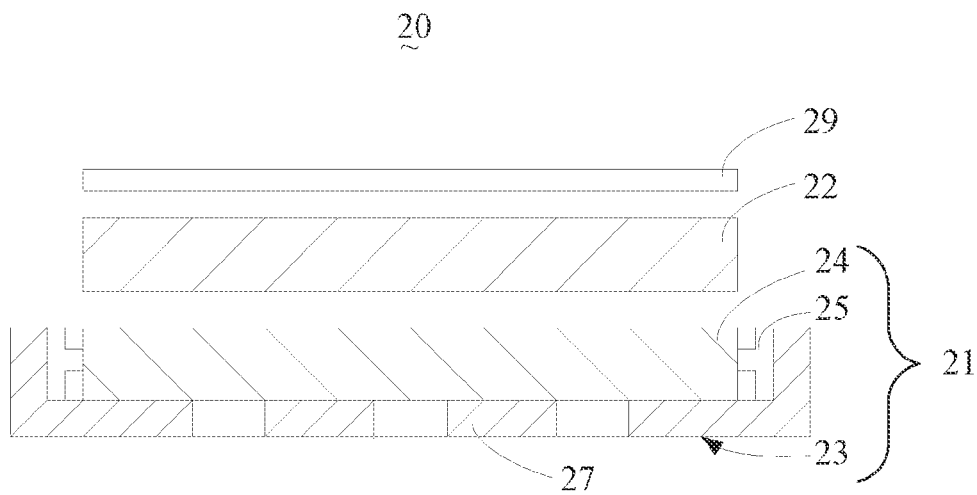
FIG. 31 is a schematic view showing a flat panel display device with a touch screen according to a twenty-ninth embodiment of the present invention.

As shown in FIG. 31, the flat panel display device 20 of the present invention further comprises a touch screen 29. The touch screen 29 is arranged on a light exit surface of the display panel 22 of the flat panel display device 20. The flat panel display device 20 comprises: the backlight system 21 and the above discussed display panel 22. The backlight system 21 is arranged at the back side of the display panel 22 and supplies light to the display panel 22.

The backlight system 21 comprises a light source 25, a light homogenization mechanism 24, and a back frame 23. The back frame 23 carries the light source 25 and the light homogenization mechanism 24. When the backlight system 21 is an edge lighting type, the light homogenization mechanism 24 is a light guide; and when the backlight system 21 is a direct type, the light homogenization mechanism 24 is a diffuser plate. The back frame 23 comprises at least a first primary assembling piece and a second primary assembling piece, and the at least one first and second primary assembling pieces constitute a main frame structure 27 of the back frame 23.

It is noted that the flat panel display device 20 of the present invention can be a liquid crystal display device or a liquid crystal television.

Figure 32:
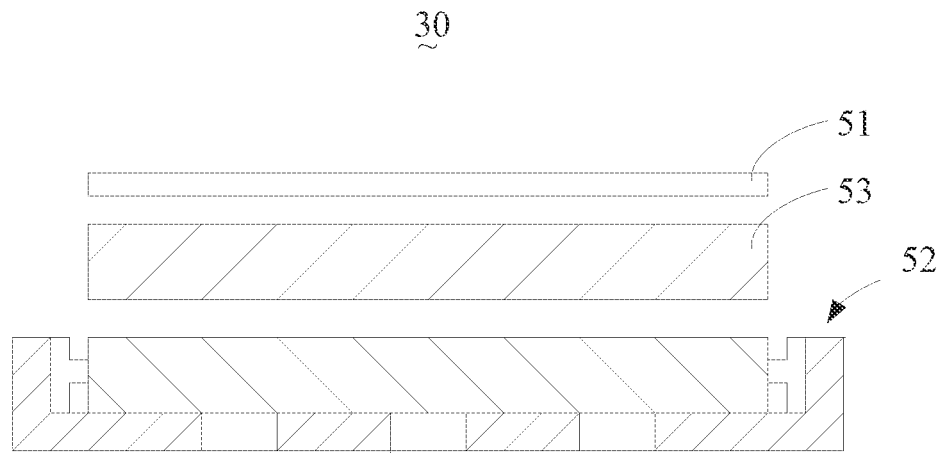
FIG. 32 is a schematic view showing a stereoscopic display device according to a thirtieth embodiment of the present invention.

The present invention also provides a stereoscopic display device 30, as shown in FIG. 32. The stereoscopic display device 30 comprises a liquid crystal lens grating 51, a backlight system 52, and a display panel 53. The liquid crystal lens grating 51 is arranged on a light exit surface of the display panel 53. The backlight system 52 can be a backlight system of one of the above discussed embodiments, such as the backlight system 52 comprising the back frame 23. The back frame 23 comprises at least first primary assembling piece and the second primary assembling piece. The at least first and second primary assembling pieces form a main frame structure of the back frame. The backlight system 32 can be of a structure of any of the previously discussed embodiments of backlight system and repeated description will be omitted herein.

Figure 33:
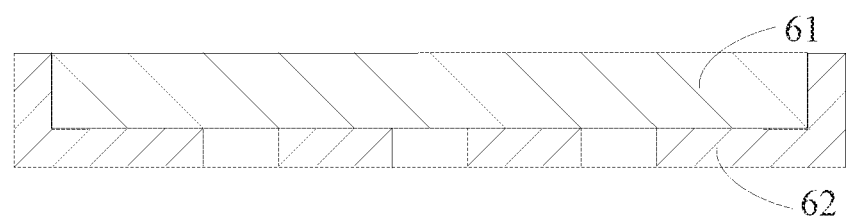
FIG. 33 is a schematic view showing a plasma display device according to a thirty-first embodiment of the present invention.

The present invention also provides a plasma display device 40, as shown in FIG. 33. The plasma display device 40 comprises a plasma display panel 61 and a back frame 62. The back frame 62 is arranged at a back side of the plasma display panel 61. The back frame 62 can be the back frame of any of the previously discussed embodiments and repeated description will be omitted herein.

With the above discussed manners, the present invention provides a flat panel display device, a stereoscopic display device, and a plasma display device that have a mold for back frame that is of a simple structure and can reduce the expenditure for mold of back frame, and can also save the material used for back frame so as to lower down the cost of flat panel display device.

Embodiments of the present invention have been described, but are not intending to impose any undue constraint to the appended claims of the present invention. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A back frame of a flat panel display device, wherein:
the back frame comprises at least two primary assembling pieces, the at least two primary assembling pieces being connected through joining;
the at least two primary assembling pieces have lengths that are adjustable in order to form a main frame structure of the back frame that is of various sizes, in which lengths of two parallel sides of the main frame structure are both subjected to adjustment;
the length-adjustable primary assembling pieces comprises a first sub-assembling piece and a second sub-assembling piece that are joined at ends;
the back frame comprises a first fastener and a second fastener, the first fastener and the second fastener being set at different locations to join the first sub-assembling piece and the second sub-assembling piece;
the first sub-assembling piece has an end forming a first slit extending in a lengthwise direction of the first sub-assembling piece and the second sub-assembling piece has an end forming a second slit extending in a lengthwise direction of the second sub-assembling piece;
the first fastener extends through the first slit and the second slit to join the first sub-assembling piece and the second sub-assembling piece and the second fastener extends through the first slit and the second slit to join the first sub-assembling piece and the second sub-assembling piece;
the first slit has two side walls between which a distance is periodically variable in a direction of the first slit to form a plurality of alternating wide spaces and narrow spaces, the wide spaces mating a size of the first fastener and the second fastener, the narrow spaces being smaller than the size of the first fastener and the second fastener; and
the second slit has two side walls between which a distance is periodically variable in a direction of the second slit to form a plurality of alternating wide spaces and narrow spaces, the wide spaces mating the size of the first fastener and the second fastener, the narrow spaces being smaller than the size of the first fastener and the second fastener.

2. The back frame as claimed in claim 1, wherein:
the first sub-assembling piece has an end forming a slide slot extending in the lengthwise direction of the first sub-assembling piece, the first slit extending in the lengthwise direction of the first sub-assembling piece, and the second sub-assembling piece has an end forming a slide track extending in the lengthwise direction of the second sub-assembling piece;
the slide slot mates the slide track.

3. The back frame as claimed in claim 1, wherein:
the length-adjustable primary assembling piece comprises the first sub-assembling piece, the second sub-assembling piece, and an intermediate assembling piece, the first sub-assembling piece being joined to an end of the intermediate assembling piece, the second sub-assembling piece being joined to another end of the intermediate assembling piece.

4. The back frame as claimed in claim 1, wherein:
the at least two primary assembling pieces comprise first and second primary assembling pieces that are joined to each other, in which the first primary assembling piece has an end having a surface forming at least two joint sections that are arranged to space from each other in a lengthwise direction of the first primary assembling piece, the first primary assembling piece using one of the joint sections to join a corresponding end of the second primary assembling piece.

5. The back frame as claimed in claim 4, wherein:
the joint sections comprise recesses formed in a surface of the first primary assembling piece and having a shape corresponding to the end of the second primary assembling piece for receiving the end of the second primary assembling piece.

6. The back frame as claimed in claim 5, wherein:
the recess of the first primary assembling piece forms in a bottom thereof a third through hole, the second primary assembling piece forming in a corresponding location a fourth through hole, the back frame comprising a fastener, the fastener extending through the third through hole and the fourth through hole to join the first primary assembling piece and the second primary assembling piece to each other.

7. The back frame as claimed in claim 4, wherein:
the joint sections comprise recesses formed in a surface of the first primary assembling piece, the second primary assembling piece having an end having a surface forming, at corresponding locations, at least two protrusions that are arranged to space from each other in a lengthwise direction of the second primary assembling piece, the protrusions being receivable in the recesses to join the first primary assembling piece and the second primary assembling piece to each other.

8. The back frame as claimed in claim 4, wherein:
the back frame comprises a third primary assembling piece and a fourth primary assembling piece; and the first primary assembling piece, the second primary assembling piece, the third primary assembling piece, and the fourth primary assembling piece are straight linear and are joined to each other in a leading end-to-tailing end manner to form a rectangular main frame structure enclosing the back frame.

9. The back frame as claimed in claim 8, wherein:
the back frame comprises secondary assembling pieces arranged in the main frame structure, the secondary assembling pieces comprise a first secondary assembling piece and a second secondary assembling piece, the first secondary assembling piece having two ends respectively joined to at least two primary assembling pieces of the first primary assembling piece, the second primary assembling piece, the third primary assembling piece, and the fourth primary assembling piece, the second secondary assembling piece having two ends respectively joined to at least two primary assembling pieces of the first primary assembling piece, the second primary assembling piece, the third primary assembling piece, and the fourth primary assembling piece.

10. The back frame as claimed in claim 9, wherein:
the two ends of the first secondary assembling piece are respectively joined to the first primary assembling piece and the second primary assembling piece that are adjacent to each other and the two ends of the second secondary assembling piece are respectively joined to the third primary assembling piece and the fourth primary assembling piece that are adjacent to each other; or
the two ends of the first secondary assembling piece are respectively joined to the first primary assembling piece and the third primary assembling piece that are opposite to each other and the two ends of the second secondary assembling piece are respectively joined to the first primary assembling piece and the third primary assembling piece that are opposite to each other, and
the second primary assembling piece, the fourth primary assembling piece, the first secondary assembling piece, and the second secondary assembling piece are arranged parallel to each other.

11. The back frame as claimed in claim 9, wherein:
the back frame comprises at least one bracing piece, which is releasably fixed to one or more of the first primary assembling piece, the second primary assembling piece, the third primary assembling piece, the fourth primary assembling piece, the first secondary assembling piece, and the second secondary assembling piece, the bracing piece forming a bump.

12. A backlight system, wherein:
the backlight system comprises a light source, a light homogenization mechanism, and a back frame; and
the back frame carries the light source and the light homogenization mechanism, the back frame being a back frame claimed in claim 1.

13. A back frame of a flat panel display device, wherein:
the back frame comprises at least two primary assembling pieces, the at least two primary assembling pieces being connected through joining;
the at least two primary assembling pieces have lengths that are adjustable in order to form a main frame structure of the back frame that is of various sizes, in which lengths of two parallel sides of the main frame structure are both subjected to adjustment;
the length-adjustable primary assembling pieces comprises a first sub-assembling piece and a second sub-assembling piece that are joined at ends;
the back frame comprises a first fastener and a second fastener, the first fastener and the second fastener being set at different locations to join the first sub-assembling piece and the second sub-assembling piece;
the first sub-assembling piece has an end forming a first through hole and a second through hole spaced in a lengthwise direction of the first sub-assembling piece and the second sub-assembling piece has an end forming a slit extending in a lengthwise direction of the second sub-assembling piece, the slit having a length greater than a spacing distance between the first through hole and the second through hole; and
the first fastener extends through the first through hole and the slit to join the first sub-assembling piece and the second sub-assembling piece and the second fastener extends through the second through hole and the slit to join the first sub-assembling piece and the second sub-assembling piece.

14. A backlight system, wherein:
the backlight system comprises a light source, a light homogenization mechanism, and a back frame; and
the back frame carries the light source and the light homogenization mechanism, the back frame being a back frame claimed in claim 13.

15. A back frame of a flat panel display device, wherein:
the back frame comprises at least two primary assembling pieces, the at least two primary assembling pieces being connected through joining;
the at least two primary assembling pieces have lengths that are adjustable in order to form a main frame structure of the back frame that is of various sizes, in which lengths of two parallel sides of the main frame structure are both subjected to adjustment;

the length-adjustable primary assembling pieces comprises a first sub-assembling piece and a second sub-assembling piece that are joined at ends;

the back frame comprises a first fastener and a second fastener, the first fastener and the second fastener being set at different locations to join the first sub-assembling piece and the second sub-assembling piece;

the first sub-assembling piece has an end forming a through hole and a first slit spaced in a lengthwise direction of the first sub-assembling piece, the first slit extending in the lengthwise direction of the first sub-assembling piece, and the second sub-assembling piece has an end forming a second slit extending in a lengthwise direction of the second sub-assembling piece, the second slit having a length greater than a spacing distance between the through hole and the first slit; and the first fastener extends through the through hole and the second slit to join the first sub-assembling piece and the second sub-assembling piece and the second fastener extends through the first slit and the second slit to join the first sub-assembling piece and the second sub-assembling piece.

16. A backlight system, wherein:

the backlight system comprises a light source, a light homogenization mechanism, and a back frame; and the back frame carries the light source and the light homogenization mechanism, the back frame being a back frame claimed in claim 15.

\* \* \* \* \*